(12) United States Patent
Piech et al.

(10) Patent No.: US 12,259,267 B2
(45) Date of Patent: Mar. 25, 2025

(54) SELF REPORTING FIRE SUPPRESSANT TANK CONFIGURATION

(71) Applicant: KIDDE-FENWAL, LLC, Ashland, MA (US)

(72) Inventors: Marcin Piech, Palm Beach Gardens, FL (US); Cezary Jedryczka, Palm Beach Gardens, FL (US); Wojciech Szelag, Palm Beach Gardens, FL (US)

(73) Assignee: KIDDE-FENWAL, LLC, Ashland, MA (US)

( * ) Notice: Subject to any disclaimer, the term of this patent is extended or adjusted under 35 U.S.C. 154(b) by 268 days.

(21) Appl. No.: 17/637,552

(22) PCT Filed: Sep. 29, 2020

(86) PCT No.: PCT/US2020/053184
§ 371 (c)(1),
(2) Date: Feb. 23, 2022

(87) PCT Pub. No.: WO2021/067213
PCT Pub. Date: Apr. 8, 2021

(65) Prior Publication Data
US 2022/0283010 A1 Sep. 8, 2022

Related U.S. Application Data

(60) Provisional application No. 62/907,842, filed on Sep. 30, 2019.

(51) Int. Cl.
*G01F 23/20* (2006.01)
*A62C 37/50* (2006.01)

(52) U.S. Cl.
CPC .............. *G01F 23/20* (2013.01); *A62C 37/50* (2013.01)

(58) Field of Classification Search
CPC ............................... G01F 23/20; A62C 37/50
(Continued)

(56) References Cited

U.S. PATENT DOCUMENTS 3,434,134 A * 3/1969 Batchelor ............. G01F 23/205
340/613
3,685,604 A * 8/1972 Smith ..................... G01G 21/02
177/184

(Continued)

FOREIGN PATENT DOCUMENTS

| CN | 2669910 Y | 12/2003 |
| CN | 2669911 Y | 12/2003 |

(Continued)

OTHER PUBLICATIONS

International Preliminary Report on Patentability for International Patent Application No. PCT/US2020/053184 issued on Apr. 5, 2022.

(Continued)

*Primary Examiner* — John Fitzgerald
(74) *Attorney, Agent, or Firm* — Honigman LLP

(57) ABSTRACT

A fire suppressant module according to one example includes a suppressant tank having a body and a base, a counterweight scale disposed in the base, and a data module comprising at least one of a display configured to display a weight of the suppressant tank and processor and a transmitter configured to communicate the weight of the suppressant tank.

19 Claims, 2 Drawing Sheets

(58) Field of Classification Search
USPC .......................................................... 73/296
See application file for complete search history.

(56) References Cited

U.S. PATENT DOCUMENTS

| | | | | |
|---|---|---|---|---|
| 3,800,893 | A * | 4/1974 | Ramsay | G01G 9/00 177/25.14 |
| 4,319,651 | A * | 3/1982 | Robichaud | G01G 3/08 177/229 |
| 4,524,617 | A * | 6/1985 | Krehel | F17C 13/023 126/41 R |
| 4,765,421 | A * | 8/1988 | Newton | G01G 19/44 177/127 |
| 4,802,541 | A * | 2/1989 | Bator | G01G 7/04 177/189 |
| 4,930,588 | A * | 6/1990 | Kuhlmann | G01G 21/24 177/168 |
| 4,932,487 | A * | 6/1990 | Melcher | G01G 21/286 73/1.13 |
| 6,129,168 | A * | 10/2000 | Lotito | B60N 2/002 177/210 EM |
| 6,284,987 | B1 | 9/2001 | Al-Modiny | |
| 6,932,382 | B2 * | 8/2005 | Hayes | B60R 21/01516 324/207.2 |
| 7,255,003 | B2 * | 8/2007 | Schneiter | G01G 21/23 73/1.13 |
| 7,267,001 | B1 | 9/2007 | Stein | |
| 7,437,150 | B1 * | 10/2008 | Morelli | G08C 17/02 455/418 |
| 7,574,911 | B2 | 8/2009 | McSheffrey et al. | |
| 7,896,435 | B2 * | 3/2011 | Griffin | B60R 21/01516 297/217.2 |
| 9,027,380 | B2 * | 5/2015 | Burkhard | G01G 7/04 73/1.13 |
| 10,132,672 | B2 * | 11/2018 | Schrag | G01G 7/02 |
| 11,668,596 | B2 * | 6/2023 | Piech | A62C 13/62 73/290 R |
| 2001/0032504 | A1 * | 10/2001 | Moseley | G01F 23/20 340/613 |
| 2004/0016576 | A1 * | 1/2004 | Kuechenmeister | G01G 17/04 177/229 |
| 2006/0118343 | A1 * | 6/2006 | Satoh | G01G 7/045 177/212 |
| 2014/0090635 | A1 * | 4/2014 | May | G01F 23/20 73/296 |
| 2016/0370221 | A1 * | 12/2016 | Schrag | G01G 7/02 |
| 2018/0169450 | A1 | 6/2018 | Moffa | |
| 2018/0169451 | A1 * | 6/2018 | Moffa | A62C 37/50 |

FOREIGN PATENT DOCUMENTS

| | | |
|---|---|---|
| CN | 201295481 Y | 10/2008 |
| CN | 102294104 B | 11/2012 |
| CN | 203220706 U | 12/2012 |
| CN | 104138641 B | 7/2014 |
| CN | 109692412 A | 10/2017 |
| CN | 108245812 A | 1/2018 |
| DE | 2500134 C3 | 1/1975 |
| DE | 4229295 A1 | 9/1992 |
| DE | 9211825 U1 | 9/1992 |
| DE | 102010038793 A1 | 8/2010 |
| FR | 1064531 A | 5/1954 |
| GB | 2315335 A | 1/1998 |
| JP | H06241875 A | 2/1993 |
| JP | 2003088596 A | 9/2001 |
| WO | 03034003 | 4/2003 |

OTHER PUBLICATIONS

Kessling, G. et al., A weighing device for use on a ship, Measurement Science and Technology, IOP, Bristol, GB, vol. 4, No. 10, Oct. 1, 1993 (Oct. 1, 1993), pp. 1035-1042, XP020065530, ISSN: 0957-0233, DOI:10.1088/0957-0233/4/0/001, figure 1.

EPO Offiical Action mailed Jan. 10, 2024.

International Search Report and Written Opinion for International Patent Application No. PCT/US2020/053184 dated completed on Jan. 4, 2021.

* cited by examiner

SELF REPORTING FIRE SUPPRESSANT TANK CONFIGURATION

CROSS-REFERENCE TO RELATED APPLICATION

This application claims priority to U.S. Provisional Patent Application No. 62/907,842 filed on Sep. 30, 2019.

TECHNICAL FIELD

The present disclosure relates generally to fire suppressant tanks, and more specifically to a fire suppressant tank configured to self-report a volume of suppressant contained within the tank.

BACKGROUND

Fire suppression systems, such as those utilized in commercial and industrial building systems include large tanks, or other reservoirs, of fire suppressant. The suppressant is dispersed by a fire suppression system in response to a detection of a fire. Fire and safety codes require regular fire suppression system inspections, and these inspections include checking a quantity of suppressant stored within the suppressant tanks to ensure sufficient suppressant is present to adequately respond to a fire.

In existing systems, the inspection is achieved by removing the suppressant tank from service, and weighing the tank on a scale provided by the inspector. This practice is labor intensive and time consuming due to the size and weight of the suppressant tanks. In addition, removal of the suppressant tanks eliminates, or reduces, the ability of the fire suppression system to respond to a detected fire during the time period of the inspection.

SUMMARY OF THE INVENTION

A fire suppressant module according to one example includes a suppressant tank comprising a body and a base, a counterweight scale disposed in the base, and a data module comprising at least one of a display configured to display a weight of the suppressant tank and processor and a transmitter configured to communicate the weight of the suppressant tank.

Another fire suppressant module according to the above example includes the base comprises a tank support plate contacting the suppressant tank and a ground plate spaced apart from the tank support plate, and wherein the counterweight scale is disposed between the tank support plate and the ground plate.

Another fire suppressant module according to any of the above examples includes a contact sensor disposed in the ground plate below an end of the counterweight scale.

Another fire suppressant module according to any of the above examples includes the contact sensor being configured to interface with a building control system using the transmitter.

Another fire suppressant module according to any of the above examples includes the counterweight scale being configured to contact the contact sensor while a weight of the suppressant tank is below a minimum suppressant weight threshold.

In another fire suppressant module according to any of the above examples includes the counterweight scale includes a pivot at a first end, a permanent magnet at a second end opposite the first end, and a counterweight disposed between the pivot and the permanent magnet.

In another fire suppressant module according to any of the above examples the counterweight scale further includes a spring disposed between the permanent magnet and the counterweight.

In another fire suppressant module according to any of the above examples includes the spring is maintained in a partially compressed state.

In another fire suppressant module according to any of the above examples includes the data module comprises a position sensor disposed proximate the permanent magnet and wherein the data module is configured to convert a relative position of the permanent magnet into a quantity of suppressant in the suppressant tank.

An exemplary method for monitoring a fire suppressant tank includes zeroing out a counterweight scale integral with the fire suppressant tank while the fire suppressant tank is in a full state and monitoring a position of a magnet disposed at an end of the counterweight scale relative to a position sensor.

Another example of the above method further includes converting the position of the magnet relative to the position sensor to a quantity of suppressant.

Another example of any of the above methods further includes displaying the remaining quantity of suppressant via a display connected to the fire suppressant tank.

Another example of any of the above methods further includes communicating the remaining quantity of suppressant to at least one of a building system and a remote device.

Another example of any of the above methods further includes generating a quantity of suppressant below minimum threshold alert in response to the end of the counterweight scale contacting a contact sensor.

Another example of any of the above methods further includes communicating the suppressant quantity below minimum threshold alert to one of a building system and a remote device.

Another example of any of the above methods further includes communicating the suppressant quantity below minimum threshold alert via at least one of an audio indicator and a visual indicator on the fire suppressant tank.

These and other features of the present invention can be best understood from the following specification and drawings, the following of which is a brief description.

DETAILED DESCRIPTION

Figure 1:
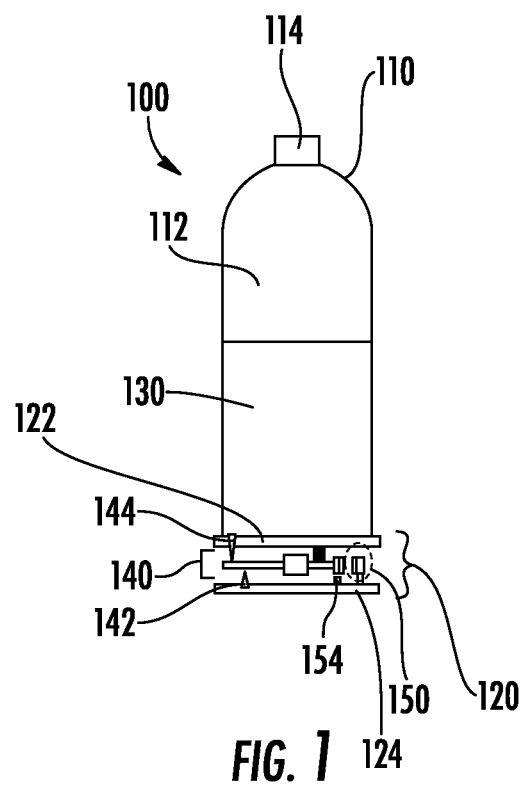
FIG. 1 schematically illustrates a side view of a fire suppressant tank including a self-reporting base configuration.

FIG. 1 schematically illustrates an exemplary fire suppression tank 100 including a body portion 110 and a base portion 120. The body portion 110 includes a volume 112 in which a fire suppressant 130 is stored. The fire suppressant 130 can be any gas or fluid fire suppressant compatible with a corresponding fire suppression system. The volume 112 is fluidly connected to the fire suppression system via a connector 114. In the illustrated example of FIG. 1, the connector 114 can be any conventional fluid tank connection suitable for the suppressant being stored within the tank 110, and the fire suppression system can be any building fire suppression system including smart building systems, standard building systems, and industrial building systems.

The base portion 120 is constructed of a top plate 122, on which the body portion 110 is supported, and a bottom plate 124 which rests on the ground or on any other surface on which the suppressant tank 100 is installed. The base portion 120 can be integral with the body portion 110 or separable from the body portion 110. Disposed between the top plate 122 and the bottom plate 124 of the base portion 120 is a counterweight scale 140. The counterweight scale 140 is configured to weigh the body portion 110. Also contained within the base portion 120 is a data module 150. The data module 150 is configured to read the weight determined by the counterweight scale 140, and provide an output to either an integral display, a dial, or to a remotely connected system. In alternative examples, any other output capable of conveying the weight or quantity of suppressant in the tank 112 can be utilized.

Figure 2:
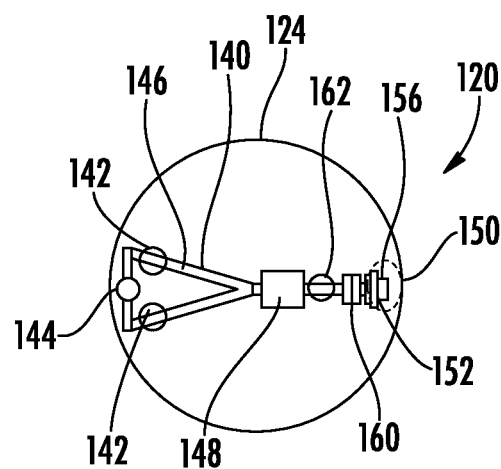
FIG. 2 schematically illustrates a top down view of a base portion of the suppressant tank with a top plate omitted for clarity.
Figure 3:
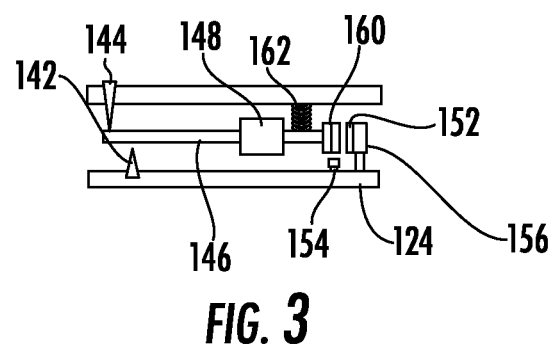
FIG. 3 illustrates a side view of the base of FIG. 2.
Figure 4:
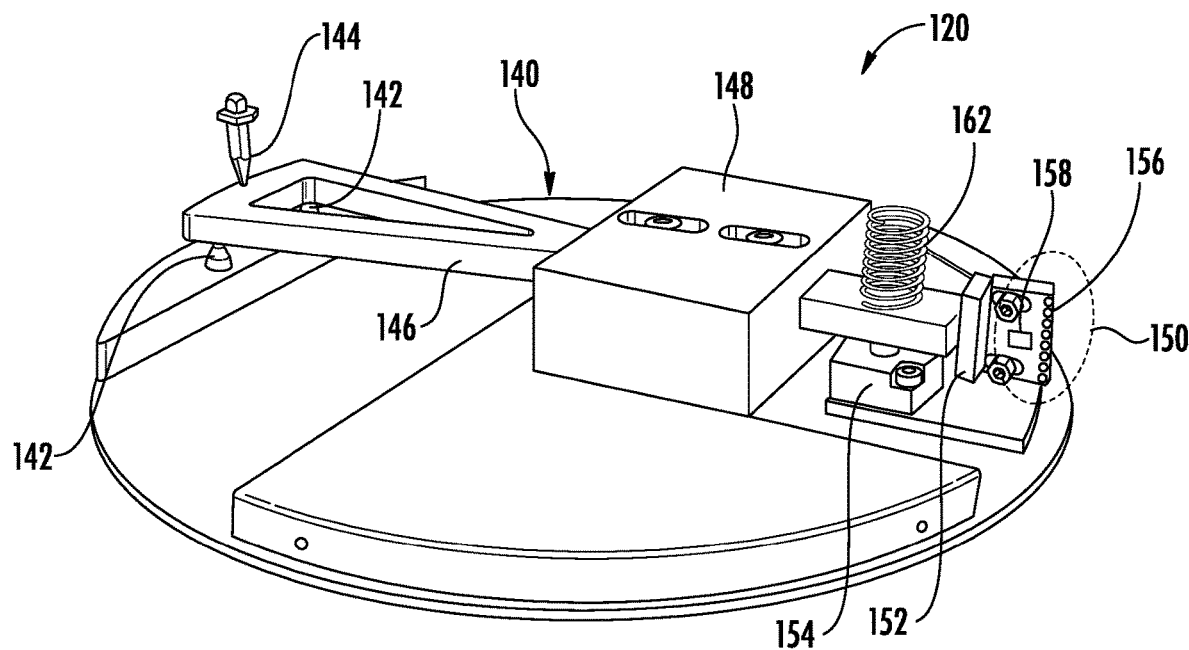
FIG. 4 schematically illustrates an isometric view of the base portion with the top plate omitted for clarity.
Figure 5:
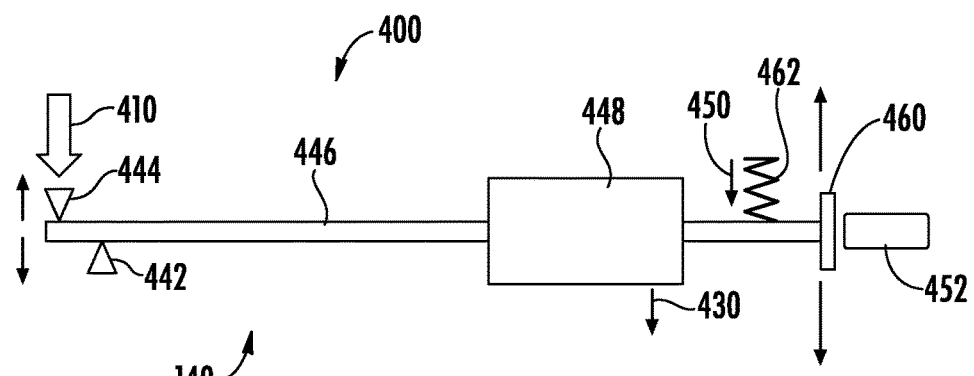
FIG. 5 schematically illustrates a force chart of an exemplary counterweight scale such as can be included within the base section of a suppressant tank.

With continued reference to FIG. 1, FIG. 2 schematically illustrates a top view of the base portion 120, with the top plate 122 omitted for clarity, FIG. 3 illustrates a side view of the base portion 120, and FIG. 4 illustrates an isometric view of the base portion 120 with the top plate 122 omitted for clarity. The counterweight scale 140 includes a lever 146 mounted to the bottom plate 124 via a pair of first pivots 142 and to the top plate 122 via a second pivot 144. The lever 146 includes two ends. The set of first pivots 142 and the second pivot 144 are physically connected to a first end of the lever 146.

Movably connected near a second end of the lever 146 is a counterweight 148. During installation and calibration of the suppressant tank 100, the counterweight 148 is slid along the lever 146 in order to balance the counterweight scale 140 in a process referred to as zeroing out. As used herein, moveably connected refers to a connection where the counterweight may be moved along the lever 146 without being disconnected from the lever 146. Disposed at the second end of the lever 146 is a magnet 160, such as a permanent magnet. The lever 146 is further maintained relative to the top plate 122 via a spring 162. The spring 162 is maintained in a partially compressed state, and is calibrated along with the counterweight 148 during installation of the suppressant tank 100.

The data module 150 includes a position sensor 152, configured to detect a relative position of the lever 146 and a contact sensor 154 configured to detect contact between the permanent magnet 160, or another portion of the lever 146 and the bottom plate 124. The data module includes a processor 158 (illustrated in FIG. 4) and is configured to convert the position of the lever 146 as determined by the relative position of the permanent magnet 160 and the sensor 152 into a weight of the suppressant tank 100. The data module 150 may, in some examples include an LCD display 156, or other type of display. In further examples, the weight may then be automatically converted to a volume, or quantity of suppressant within the tank 100. During an inspection, an inspector may read the output of the display 156 and determine, based on the weight of the suppressant tank 100, how much suppressant remains in the tank 100. In alternative examples, the display 156 may be omitted, and the data module 150 may include an output antenna, a physical output connection, or any other means for outputting communications and may communicate directly with a building system or a remote device via any communication protocol. In such an example, the data is provided to the building system or remote device and displayed within the environment of that building system or remote device. In yet another example, the data module 150 may communicate with a building system or remote device and include the display 156.

In addition to the output display, the contact sensor 154 provides a minimum suppressant level threshold check. When the quantity of suppressant in the tank 100 volume 112 falls below a minimum required quantity, the spring 162 forces the sensor end of the lever 146 downward resulting in contact between the lever 146 or the magnet 160 and the contact sensor 154. The contact sensor 154 may further be communicatively connected to the display 156, or any other alert system, and provides an alert that the suppressant tank 100 is below the minimum quantity of suppressant. In some examples the alert is communicated to either a remote device or a smart building system. In other examples, the alert may be in the form of an audio indicator or a visual indicator on or proximate to and communicatively connected to the fire suppressant tank itself. In yet further examples, both the audio/visual indicator(s) and the communication to a smart building system or a remote device may be used in conjunction with each other. In yet another example, the output display can provide a maximum threshold indication indicative of the suppressant tank meeting or exceeding a maximum amount of suppressant during a suppressant filling operation.

In alternative examples, the data module 150 may be communicatively connected to one or more smart building systems or include a low range wireless communication transmitter configured to allow the data module 150 to interface with a corresponding mobile device. In such an example, the data module 150 may transmit the weight or quantity of suppressant to the smart building system either periodically or continuously, and the smart building system may determine appropriate responses based on the quantity received. As used herein a smart building system is any building system communicatively connected to, and controlled by, a central building server.

With continued reference to FIGS. 1-4, FIG. 5 schematically illustrates a force chart 400 on the counterweight scale 140. The scale operates on the principle of a double-sided lever. While in an installed positioned, a force of the full suppressant tank provides a downward force 410 at the first end of the lever 446. Thus, the short arm from pivots 442 to pivot 444 is loaded by ⅓ of the weight of the suppression tank 100. This positioning of the pivots 442, 444 drives the second end of the lever 446 upward. Counteracting the upward force is the weight 430 of the counterweight 448. This counterweight balances a significant part of the suppressant tank weight. In the measuring range, the measured value is compensated by the spring 462. The spring 462 is maintained in a partially compressed state, providing a downward force 450 on the second end of the lever 446. The spring 462 supplements the weight 430 of the counterweight 448 and acts to stabilize and protect the counterweight scale against damage. In particular, the spring serves to dampen ambient vibrations that could negatively impact the weight read-out. It also serves to limit excessive motion of the lever 446 and the permanent magnet 460 in either direction preventing contact with the top plate 122 and the contact sensor 154. By sliding the counterweight 448 along the lever 446, a balanced position can be identified while the tank is full. While in the balanced position a permanent magnet 460 is maintained at an even position with a magnetic position sensor 452. This magnetic position sensor may be for example a magnetic field sensor, an inductive sensor or any other suitable sensor type. Increase of weight on the tank (e.g. overfilling the tank) drives the magnet upward relative to the position sensor 452, and expenditure of fire suppressant from the tank (e.g. due to leakage, evaporation, or response to a fire) decreases the weight of the tank and causes the magnet 460 to be driven downward. Overall, this spring-compensated double-sided lever configuration affords high weight resolution and robust operation over time. Specifically, the lever ratio reduces the force that the spring compensates for, allowing to neglect the impact of the spring aging.

Based on the relationship between the relative position of the magnet, the weight of the tank, and the weight of the fire suppressant within the tank, a controller within the sensor, or to which the sensor is communicating, can determine a quantity of suppressant within the tank, and communicate that quantity in the manner described above. The particular controller can be any conventional controller configured to determine the quantity of suppressant based on a relationship between the weight of the suppressant and the quantity of the suppressant. The specific relationship is dependent on the particular suppressant and the pressure of the tank, and can be determined by one of skill in the art for any given suppressant/tank configuration. In some examples, the relationship may be determined via calibration during installation of the fire suppressant system. In alternative examples, the relationship may be determined based on a theoretical correlation between magnitude of the suppressant and weight of the suppressant based on expected ambient conditions.

Implementation of the integrated counterweight scale into each of the suppressant tanks 100 simplifies the inspection process for suppression tanks. In some examples, the time savings resulting from inspections being limited to a visual inspection of the data module can reduce the inspection time to as little as one tenth of the previous inspection times due to the ability of a single person to perform the entire inspection without requiring removal or movement of any of the suppression tanks 100. Further, the inspection may be performed on demand without requiring any downtime or reduced efficiency time of the fire suppression system.

It is further understood that any of the above described concepts can be used alone or in combination with any or all of the other above described concepts. Although an embodiment of this invention has been disclosed, a worker of ordinary skill in this art would recognize that certain modifications would come within the scope of this invention. For that reason, the following claims should be studied to determine the true scope and content of this invention.

The invention claimed is:

1. A fire suppressant module comprising:
a suppressant tank comprising a body and a base, wherein the base comprises a tank support plate contacting the suppressant tank and a ground plate spaced apart from the tank support plate;
a counterweight scale disposed in the base, the counterweight scale includes a lever and a biasing member, wherein the counterweight scale is disposed between the tank support plate and the ground plate;
a contact sensor disposed between the tank support plate and the ground plate wherein the biasing member is configured to continuously urge the lever towards the contact sensor, wherein the biasing member is further configured to place the lever into contact with the contact sensor when a weight of the suppressant tank falls below a predetermined amount; and
a data module comprising at least one of a display configured to display the weight of the suppressant tank and processor and a transmitter configured to communicate the weight of the suppressant tank.

2. The fire suppressant module of claim 1, wherein the contact sensor is disposed on the ground plate below an end of the counterweight scale.

3. The fire suppressant module of claim 2, wherein the contact sensor is configured to interface with a building control system using the transmitter.

4. The fire suppressant module of claim 2, wherein the counterweight scale is configured to contact the contact sensor while a weight of the suppressant tank is below a minimum suppressant weight threshold.

5. The fire suppressant module of claim 1, wherein the counterweight scale comprises a pivot at a first end, a permanent magnet at a second end opposite the first end, and a counterweight disposed between the pivot and the permanent magnet.

6. The fire suppressant module of claim 5, wherein the data module comprises a position sensor disposed proximate the permanent magnet and wherein the data module is configured to convert a relative position of the permanent magnet into a quantity of suppressant in the suppressant tank.

7. The fire suppressant module of claim 5, wherein the biasing member is a spring and the spring is disposed between the permanent magnet and the counterweight.

8. The fire suppressant module of claim 7, wherein the spring is maintained in a partially compressed state.

9. The fire suppressant module of claim 1, wherein the lever is mounted to the ground plate via at least one first pivot and to the tank support plate via at least one second pivot.

10. The fire suppressant module of claim 9, wherein the lever extends from a first end to a second end, and wherein the at least one first pivot and the at least one second pivot are at the first end, and including a permanent magnet at the second end that is positioned between the tank support plate and the contact sensor.

11. The fire suppressant module of claim 10, including a counterweight mounted to the lever between the permanent magnet and the at least one first and second pivots for sliding movement along the lever.

12. The fire suppressant module of claim 11, including a position sensor configured to detect a relative position of the lever, wherein the position sensor is disposed between the tank support plate and the ground plate.

13. The fire suppressant module of claim 12, wherein the position sensor faces the permanent magnet.

14. The fire suppressant module of claim 11, wherein the at least one first pivot comprises a pair of pivots that are spaced apart from each other in a direction transverse to a sliding path of the counterweight along the lever.

15. The fire suppressant module of claim 14, wherein the at least one second pivot is positioned between the pair of pivots in the direction transverse to the sliding path.

16. The fire suppressant module of claim 14, wherein the at least one second pivot is offset from the pair of pivots along the sliding path.

17. The fire suppressant module of claim 11, including a spring positioned between the lever and the tank support plate.

18. The fire suppressant module of claim 17, wherein the spring is maintained in a partially compressed state, and when a quantity of suppressant in the suppressant tank falls below a minimum required quantity, the spring forces the lever downward toward the contact sensor.

19. The fire suppressant module of claim 17, wherein the spring contacts the lever between the counterweight and the permanent magnet.

* * * * *